(No Model.)

W. C. GINN.
CAKE BEATER.

No. 290,033. Patented Dec. 11, 1883.

Witnesses:
Theo. Mungen
John T. Morrow

Inventor:
W. C. Ginn
by Anderson & Smith
his attorneys

UNITED STATES PATENT OFFICE.

WESLEY C. GINN, OF SYRACUSE, NEW YORK.

CAKE-BEATER.

SPECIFICATION forming part of Letters Patent No. 290,033, dated December 11, 1883.

Application filed October 22, 1883. (No model.)

*To all whom it may concern:*

Be it known that I, WESLEY C. GINN, a citizen of the United States, residing at Syracuse, in the county of Onondaga and State of New York, have invented certain new and useful Improvements in Cake-Beaters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
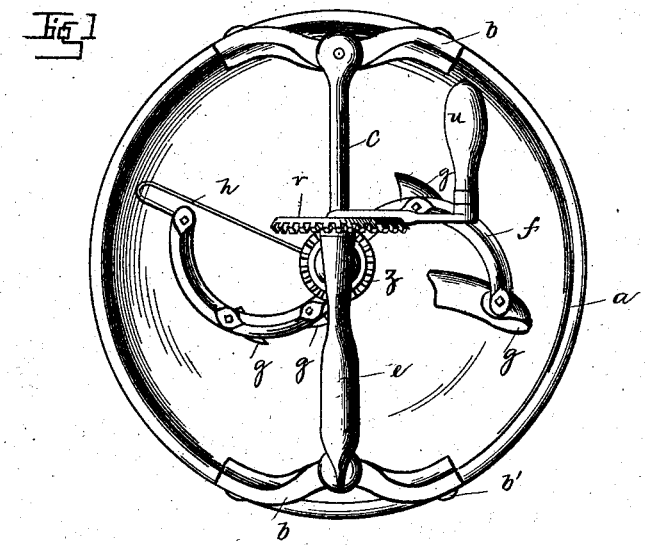
Figure 2:
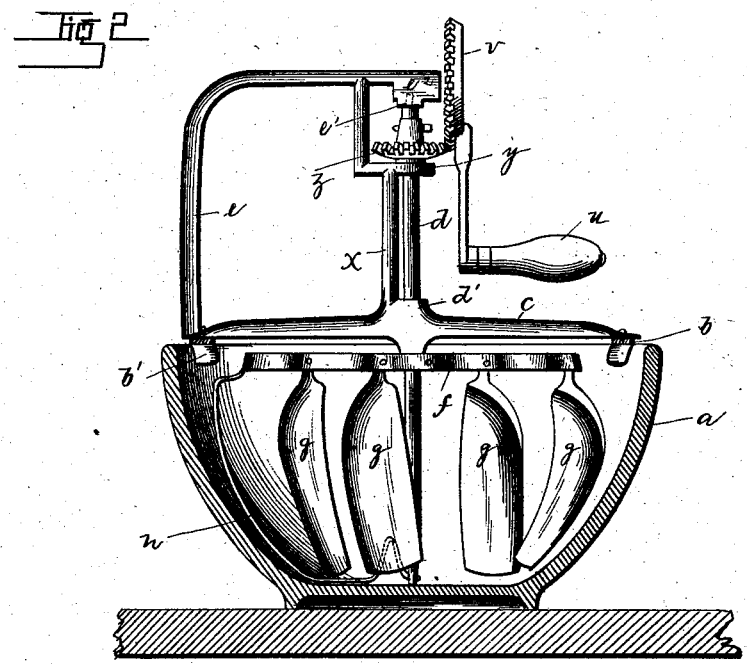
Figure 3:
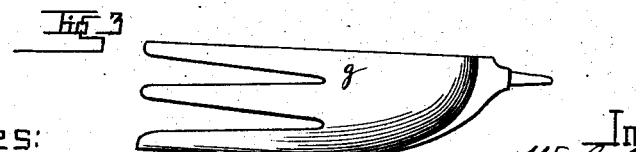

Figure 1 of the drawings is a representation of a plan view of the cake-beater. Fig. 2 is a vertical sectional view, and Fig. 3 is a detail view, of the fork beater.

This invention has relation to cake-beaters; and it consists in the construction and novel arrangement of devices, as will be hereinafter fully described, and particularly pointed out in the claims appended.

Referring by letter to the accompanying drawings, $a$ designates the bowl or vessel in which the cake-batter is to be beaten, cream whipped, emulsions mixed, &c.

$b\ b$ designate the end rests, having feet $b'\ b'$ at their ends, concave in their under faces to fit the rim of the vessel in which the beater is used. The end rests, $b\ b$, support the cross-bar $c$ of the frame-work. The cross-bar $c$ serves also as a hand-rest to hold the device in place upon the vessel during the operation of beating or mixing its contents. From one end of the cross-bar $c$ an arm, $e$, rises, and extends vertically for a suitable distance, where it is bent inward horizontally and parallel to the cross-bar $c$. The horizontal portion of the arm $e$ extends slightly beyond the center of the cross-bar $c$, and is provided on its under face directly over the central opening, $e'$, in the cross-bar $c$, with a journal-box, $e^2$, for the upper end of the revolving shaft $d$.

At one side of the enlargement $d'$ of the cross-bar $c$ there rises a second arm, $x$, which is connected at its upper end with the horizontal portion of the arm $e$, and is provided with an intermediate bearing, $y$, for the revolving shaft $d$, and the horizontal miter gear-wheel $z$, keyed thereto. A vertical miter gear-wheel, $v$, is journaled on the end of the arm $e$, meshes with the miter-gear $z$, and is provided with a handle, $u$, for operating the gear to rotate the shaft $d$, the bottom of which is near the bottom of the vessel $a$.

Below the cross-bar $c$ an S-shaped arm, $f$, is keyed to the revolving shaft $d$, and is provided with four spoon-shaped or fork-shaped beaters, $g\ g\ g\ g$, two at the ends and two intermediate ones, as shown in the drawings; but the number may be varied. The S-shaped arm $f$ is also provided at one end with a scraper or reamer, $h$, which is of spring-wire or elastic flat spring-steel, bent to conform to the vertical curve of the vessel. The lower end of reamer $h$ is connected to the revolving shaft $d$ near its lower end, and serves to clean or sweep the inner circumference of the vessel when operated. The revolving shaft operates the S-shaped arm, which carries the beaters and the reamer around through the mass to be beaten or mixed, and the beaters and reamer perform their work thoroughly and quickly.

The device is simple, cheap, and durable, and is not liable to get out of order, while at the same time it may be easily and quickly removed and cleaned.

Having thus fully described my invention, what I claim as new, and desire to secure by Letters Patent, is—

1. In a cake-beater, the combination, with the frame having its cross-bar supported on end rests adapted to fit the edge of the vessel in which it is to be used, of the revolving shaft driven by suitable gearing, and the S-shaped arm keyed thereto below the cross-bar, and provided with vertically-depending beaters, substantially as specified.

2. In a cake-beater, the combination, with the frame, gearing, and the revolving shaft, of an S-shaped arm keyed to the shaft and carrying vertical beaters, and an elastic scraper or reamer conforming in outline to the vertical curve of the vessel in which it is used, substantially as specified.

In testimony whereof I affix my signature in presence of two witnesses.

WESLEY C. GINN.

Witnesses:
W. G. McDOWELL,
E. E. EWERS.